(12) United States Patent
Kunze et al.

(10) Patent No.: US 11,094,086 B2
(45) Date of Patent: Aug. 17, 2021

(54) METHOD AND APPARATUS FOR CODING IMAGE DATA

(71) Applicant: Basler AG, Ahrensburg (DE)

(72) Inventors: Jörg Kunze, Ahrensburg (DE);
Michael Niesyto, Ahrensburg (DE)

(73) Assignee: BASLER AG, Ahrensburg (DE)

( * ) Notice: Subject to any disclaimer, the term of this patent is extended or adjusted under 35 U.S.C. 154(b) by 154 days.

(21) Appl. No.: 16/393,010

(22) Filed: Apr. 24, 2019

(65) Prior Publication Data

US 2019/0333251 A1   Oct. 31, 2019

(30) Foreign Application Priority Data

Apr. 30, 2018   (DE) .................. 10 2018 110 383.2

(51) Int. Cl.
| | | |
|---|---|---|
| *G06T 9/00* | (2006.01) | |
| *G06T 7/00* | (2017.01) | |
| *G06T 3/40* | (2006.01) | |

(52) U.S. Cl.
CPC .............. *G06T 9/00* (2013.01); *G06T 3/40* (2013.01); *G06T 7/97* (2017.01); *G06T 2207/20224* (2013.01)

(58) Field of Classification Search
CPC ...................................... G06T 9/00; G06T 7/97
See application file for complete search history.

(56) References Cited

U.S. PATENT DOCUMENTS

| | | |
|---|---|---|
| 4,725,885 A | 2/1988 | Gonzales et al. |
| 4,897,855 A | 1/1990 | Acampora |
| 5,440,344 A * | 8/1995 | Asamura .............. H04N 9/8047 375/240.01 |
| 8,045,814 B2 | 10/2011 | Odagiri et al. |
| 2009/0262247 A1 | 10/2009 | Huang et al. |

(Continued)

FOREIGN PATENT DOCUMENTS

| | | |
|---|---|---|
| EP | 2034741 A1 | 3/2009 |
| EP | 2501133 A2 | 9/2012 |

OTHER PUBLICATIONS

Joachim Keinert, et al., "Introduction to JPEGXS—The New Low Complexity Codec Standard for Professional Video Production," https://www.ibc.org/content-management/introduction-to-jpeg-xs/2452.article.

(Continued)

*Primary Examiner* — Joshua L Schwartz
(74) *Attorney, Agent, or Firm* — Greer, Burns & Crain, Ltd.

(57) ABSTRACT

A method for coding an image comprising a plurality of pixels. For at least one pixel of the plurality, a differential value is calculated from a value of the pixel and at least one surrounding pixel value, which occurs in the proximity of the pixel in the image. A quantizer is selected from a plurality of quantizers, and the differential value is assigned to a quantizer value by means of the selected quantizer. The quantizer value is assigned to a bit sequence by means of a coding. Thereby, the coding is based on an averaging of incidences of values the individual quantizers of the plurality can assume for pixel value differences respectively. Furthermore, a method is provided for transmitting an image comprising of a plurality of pixels to a receiver, an apparatus for coding an image comprising of a plurality of pixels and a system for transmitting image data.

17 Claims, 2 Drawing Sheets

(56) References Cited

U.S. PATENT DOCUMENTS

| | | | |
|---|---|---|---|
| 2013/0044808 A1* | 2/2013 | Nakagawa | H04N 19/105 |
| | | | 375/240.03 |
| 2015/0146776 A1* | 5/2015 | Koyama | H04N 19/593 |
| | | | 375/240.03 |
| 2015/0334268 A1 | 11/2015 | Lebowsky | |
| 2016/0227223 A1 | 8/2016 | Lebowsky | |
| 2018/0184123 A1* | 6/2018 | Terada | H04N 19/109 |

OTHER PUBLICATIONS

Fritz Lebowsky, et al., "Extraordinary Perceptual Color Stability in Low Cost, Real Time Color Image Compression Inspired by Structure Tensor Analysis," Electronic Imaging 2017, No. 18, pp. 156-167.

German Office Action dated Nov. 16, 2018; priority document.

* cited by examiner

METHOD AND APPARATUS FOR CODING IMAGE DATA

CROSS-REFERENCES TO RELATED APPLICATIONS

This application claims the benefit of the German patent application No. 10 2018 110 383.2 filed on Apr. 30, 2018, the entire disclosures of which are incorporated herein by way of reference.

FIELD OF THE INVENTION

The present invention relates to a method and an apparatus respectively for coding an image consisting of a plurality of pixels. The invention furthermore relates to a method for transmitting such an image and a system for transmitting image data.

BACKGROUND OF THE INVENTION

For image capture, digital cameras are available with an optical system, as well as a multitude of image sensors, which are respectively set up to generate electrical charges from incidental light. The related signals are typically converted to bit-words (for example, 8-digit bytes) (or are assigned to these) and can, depending on the camera type or intended purpose, be saved in the camera and/or be transmitted (in a wireless or wired manner) to a receiver.

Since only a limited memory space and a limited transmission bandwidth are generally available, in some applications, the data are compressed with the aid of suitable algorithms and then later decompressed again. The respective algorithms can comprise a quantization, which can lead to an irreversible reduction in the data volume.

Known image compression methods include JPEG, PNG, and GIF for example. However, in the case of JPEG, unfavorable losses arise so that the decompressed image relatively strongly deviates from the original image and only a low level of bandwidth reduction is frequently achieved using the PNG and the GIF method.

In the publication EP 2 501 133 A2, a method and an apparatus for bandwidth reduction for image data are disclosed. Thereby, a difference between the value of a pixel and the value, which is determined from an adjacent or a temporally preceding pixel, is coded as a bit-word. The bit-word has a length, which corresponds to the rounded negative dual logarithm of a neighboring difference distribution function of the value of the difference to be coded.

From the publication published at https://www.ibc.org/content-management/introductionto-jpeg-xs/2452.article "INTRODUCTION TO JPEG XS—THE NEW LOW COMPLEXITY CODEC STANDARD FOR PROFESSIONAL VIDEO PRODUCTION" by Joachim Keinert, Jean-Baptiste Lorent, Antonin Descampe, Gael Rouvroy, and Siegfried Fößel, a coding is known, which comprises an integer irreversible wavelet transformation and an entropy coding of the resulting wavelet coefficient. Thereby, image data should be transmitted with a low level of quality loss and short latency, thereby making higher resolutions possible, for example, in 360° films.

From US 2016/0227223 A1, a method and an apparatus are known, which should reduce a bandwidth required for transmitting images, wherein the visual quality of the image should be maintained to a great extent. In addition, correlations that occur in the case of the individual colors changing are taken into account.

The publication "Extraordinary perceptual color stability in low cost, real time color image compression inspired by structure tensor analysis" (in: Electronic Imaging 2017 (2017), no. 18, pp. 156-167.—ISSN 2470-1173) by Fritz Lebowsky and Mariano Bona discloses an algorithm for image compression where gradients two adjacent pixels are calculated for a pixel. Based on the gradients, a differentiation is made between three classes, namely, extremum, contour and level. Depending on the class, the gradients are quantized, taking an error density and a local brightness into account. From the quantized gradients, the one that produces the minimal error is transmitted.

From the publication US 2015/0334268 A1; an approaches known whereby amplitudes of color components of the pixels are approximated in groups by a monotone function, which has the positions of the pixels as a variable: Thereby, the occurrence of visible deterioration in a presented transmitted image in comparison with the original image should be reduced.

In the publication US 2009/0262247 A1, an image processing system is disclosed, which filters and interpolates image data. Thereby, blurry and/or jagged edges in an image display should be respectably avoided.

However, the method approaches known from the most recent background art signify a partly high resource expenditure in an integrated circuit of the camera, which can carry out the calculation (e.g. in a so-called "field programmable gate array," referred to in short as "FPGA") and/or in the decoding receiver. In addition, during transmission, they in part require relatively long delay times (latencies), which are unfavorable in the case of real-time applications.

SUMMARY OF THE INVENTION

An object of the present invention is to provide an alternative technique for coding image data, which enables data compression to take place at various intensities with a particularly low level of complexity, meaning a particularly low level of resource expenditure.

A first method according to the invention is used for a coding of an image comprising a plurality of pixels. For one or more (in particular for all) pixels of the plurality, a differential value is calculated from the value of the pixel and at least one surrounding pixel value, meaning the value of another pixel occurring in proximity of the pixel within the image (for example, of an adjacent pixel in a specified working direction). The differential value determined in this way is assigned to a quantizer value by means of a quantizer; thereby, the quantizer has been selected from a plurality of quantizers. The quantizers of the plurality can be saved, for example, in a common or in different electronic memory unit(s).

The quantizer value and/or a sequence containing the quantizer value is assigned to a bit sequence by means of a coding; thereby, under the term sequence," a sequence of a plurality of quantizer values is understood.

Thereby, the coding is based on an averaging of incidences of those values, which can be assumed by the individual quantizers of the plurality (respectively for differences of pixel values) (which are thereby possible quantizer values).

In the event that the sequence is assigned to the bit sequence as indicated, in addition to this (said) quantizer value, this sequence can contain at least one value, which results due to the application of the selected quantizer or another quantizer of the plurality on a difference of another pixel of the plurality with a respective surrounding pixel value.

A second method according to the invention is used to transmit an image comprising or consisting of a plurality of pixels to a receiver. It entails a coding of the image under the use of one of the embodiments of the first inventive method disclosed within this publication. The at least one bit sequence resulting from this is then transmitted to the receiver (wirelessly or wired or by means of a storage medium, such as an SO card in particular), for example, by a digital camera. The receiver converts the at least one bit sequence into a respective received pixel value (meaning it decodes the at least one bit sequence in accordance with a decoding system belonging to the coding). Ultimately, the respective received pixel value is integrated into a received image.

In accordance with a favorable variant of the second method according to the invention, furthermore, the received image is shown on a display (e.g., a screen) and/or a subject to an automated image analysis.

Provided that the mentioned steps are carried out for a plurality of the pixels or bit sequences, a respective differential value is calculated accordingly (in the case of the first method according to the invention) and assigned to a respective quantizer value, which, for its part, is assigned to a respective bit sequence by means of a coding. Thereby, the quantizer can be selected for the plurality of pixels together (in particular, for example, for the overall image) or, in turn, for the (individual) pixels respectively. In the case of the second method according to the invention, in the mentioned case, the respective bit sequence is converted into a respective received pixel value analogously, which is then integrated into the received image. The indication of "respective" is mostly done without in the following for the sake of better readability.

A coding of the image results from the at least one bit sequence obtained in accordance with the aforementioned method, possibly plus values (in particular, bit sequences) which can be determined for other pixels of the plurality in a corresponding way or in another way.

In particular, the coding according to the invention by virtue of the averaging is based on a combination of the different quantizers of the plurality so that the coding universally takes place for the quantizers of the plurality. Thereby, the coding is designed as a map, which associates a corresponding bit sequence to each possible quantizer value (preferably in an injective manner), which can be assumed by one or a plurality of the quantizers. The assignment of the quantizer values resulting in a specific case from a differential value for a pixel to the bit sequence therefore takes place independently of which of the quantizers was previously used, meaning which one provided the respective quantizer value.

While at least two or all of the plurality of quantizers make degrees of compression that are preferably different from one another possible for the image to be respectively coded or at least for one region containing the at least one pixel, the universal coding allows for an implementation with a low level of complexity and therefore a low level of resource expenditure both for the coding itself as well as for a (later) decoding. Thereby, in the case of the latter, it must not be known which of the quantizers has provided the respective quantizer value, on which the respective bit sequences based; in the case of a transmission of the bit sequence or saving it, an additional identification of the respective quantizer can therefore favorably be done without. In particular, by means of this the information to be transmitted can be reduced, thereby saving bandwidth.

The averaging, which the coding is based on, is preferably a map, which is defined upon uniting value sets of the quantizers of the plurality, the definition set of which is or includes the mentioned united set. In particular, thereby, it can assign an average value (in particular, a weighted or usual arithmetical or geometric average value) from the incidences to any point (value) of the united set, by means of which the individual quantizers (of the plurality) assume the respective point.

The assignment (according to the invention) of the quantizer value or, if applicable, the sequence containing the quantizer value with the bit sequence preferably takes place based on the mentioned averaging (meaning the map) at the point of the quantizer values (which the differential value was assigned to).

In accordance with a favorable embodiment, the coding is (additionally) based on at least one reference image, meaning at least one digital image of a reference image set. Such a reference image set can contain one or a plurality of (digital) image(s) of a predetermined library (in particular, coincide with such a library) and/or at least one digital image, which is, for example, created or has been created at the time of application; for example, the digital reference image can be an image preceding or having preceded the image to be coded or it can even be the image to be coded itself.

The incidences of the values then preferably indicate a frequency of occurrence respectively, with which the respective value is assumed by the respective quantizer for pixel value differences in the at least one digital reference image. The averaging underlying the coding is then preferably an averaging of incidences of values, the individual quantizers of the plurality can assume for the pixel value differences occurring within the at least one digital reference image respectively.

For the values in the mentioned definition set of the averaging (as a map), the incidences then preferably result as relative frequencies of occurrence from a number of pixels in the at least one digital reference image (for each of the individual quantizers), with comprise a pixel difference to a neighboring pixel, which is assigned to the respective value by the respective quantizer, divided by an overall number of pixels taken into consideration within the at least one digital reference image. The averaging can then be calculated for each of the values as an (for example, a weighted or unweighted arithmetical or geometrical) means of these incidences related to the individual quantizers.

In accordance with the favorable embodiment of the method according to the invention, the plurality of pixels of the image comprises a value p respectively, for which $0 \leq P \leq 2n-1$ applies, wherein n is a natural positive number. The method can then include a modification of the differential value d by forming the residue classes modulo 2n:

For the modified differential value $\tilde{d}=d \bmod 2n$, $0 \leq \tilde{d} \leq 2n-1$ applies so that the quantizers of the plurality (re-)defined to the set of modified differences operate with correspondingly small values. In this way, the computational effort for the coding can be reduced.

The image to be coded according to the method can be a color image (the pixels of which for example can lie in the RGB color spectrum) or a grey-scale image (with shades of grey or as a pure black-and-white image without nuances). In accordance with the special exemplary embodiment, $0 \leq p \leq 255$ applies (so that, in the aforementioned formula, n=8 applies) applies to the values p of the image.

In accordance with a favorable embodiment of the present invention, the coding includes an entropy coding based on the averaging. The entropy coding can, for example, a Huffman coding, arithmetic coding, and/or an ANS coding (wherein "ANS" stands for the term "asymmetric numeral system"), In particular, a length of the bit sequence can be chosen according to an incidence of the underlying quantizer value or the underlying sequence, which makes an optimization of the resource expenditure for the image associated with further processing (for example, transmission and/or saving) possible.

The coding (meaning a corresponding assignment rule) can be preferably called up in the form of a data structure from a memory. The assignment of the respective quantizer value to the respective bit sequence then preferably entails calling up the data structure. As an alternative, a method according to the invention can entail a determination of the coding.

In accordance with a favorable embodiment, the plurality of quantizers are structured to the extent that, under each two quantizers of the plurality, a first and a second quantizer are such that the value set of the first quantizer has fewer elements than the value set of the second quantizer. In particular, the quantizers can preferably be ordered with regard to their number of levels and thereby, the power of their value sets. As the number of levels increases, an average square quantization error is reduced (at least within a region of the image containing the at least one pixel)

The value set of the second quantizer can preferably be contained within the value set of the first quantizer.

Preferably, the plurality of quantizers comprise an ideal quantizer, the number of levels of which corresponds to the number of possible differences (in an image), which is, in particular, injective; this makes a loss-free saving or transmission possible. The ideal quantizer can, for example, be or implement the identity map.

In accordance with a favorable embodiment, a method according to the invention entails determining at least one of the quantizers, in particular, the selected quantizer.

At least one quantizer of the plurality, in particular the selected quantizer, preferably comprises a nonlinear graduation of the quantizer levels.

An embodiment is particularly preferred where the at least one of the quantizers, preferably the selected quantizer in particular, is based on an incidence of pixel differences in at least one digital image of an image set. In this way, the quantizer can be optimized for one or a plurality of images of the image set, in particular, by it quantizes differential values, which frequently occur in the image(s) of the image set, with fewer errors than less frequently occurring differential values.

Such a quantizer can also be viewed as being favorable for any image (not contained in the image set). It has namely been shown that the incidences of pixel differences in the case of the captured images map the reality are distributed very similarly to one another.

Like the aforementioned reference image set, the image set can contain a digital image belonging to a predetermined library and/or at least one digital image, which is or has been previously captured (in particular, a live image). In particular, the digital image of the image set can coincide with the image to be coded. In the case that the coding is based on at least one reference image as is mentioned above, meaning an image of a reference image set, the image set can coincide with the reference image set or differ from this (in at least one digital image).

In accordance with a favorable embodiment, at least one of the quantizers of the plurality, in particular, the selected quantizer, is based on a probability density (function).

The probability density can, on its own part, be formed as an unweighted or weighted (e.g., arithmetical or geometric) means of a plurality of probability density functions, which approximate differential values occurring in a respectively related digital image of a predetermined image set. In accordance with a favorable embodiment, a method according to the invention entails a determination of such a quantizer.

The plurality of probability density functions can, in particular, each be a probability density to the normal, to the Cauchy or to the Laplace distribution and comprise related scale parameters. Thereby, the scale parameters can be determined in such a way that the respective probability density—as mentioned above—is optimal for a related image of the image set with regard to the incidence of pixel differences (in the respective family of the density functions, for example, the family of densities to Cauchy distributions).

The (scalar) weights for forming a weighted means can thereby be selected according to a frequency distribution within the image set.

Such a formation of the plurality of quantizers makes a particularly low-resource implementation of the coding possible (and the related decoding) as well as a particularly good implementability of a data volume required for a transmission and/or saving and a compression factor resulting from the coding.

In addition or as an alternative, the at least one quantizer of the plurality, in particular, the selected quantizer can be determined based on at least one other quantizer, which has a lower number of levels than the one to be determined. In particular, in this way, starting from a first quantizer with a low number of levels, the plurality of quantizers can be determined recursively. The first quantizer can, for example, be determined by means of the known Lloyd-Max method, for example, for a probability density, which, as is described above, is formed or can be formed as a weighted or unweighted means of a plurality of probability density functions.

Selecting the quantizer can take place in the case of the method according to the invention taking a variable into account, which can be configured, for example, by a user and/or automatically. For example, the variable can indicate a number of levels and/or an identification of the quantizer to be selected. This makes the estimation of the quantizer error and/or a data volume possible, which will be required for a transmission of the bit sequence resulting from the selection (which is assigned to the difference value according to the invention).

In accordance with a favorable embodiment of a method according to the invention, a related bit sequence is assigned to at least one other pixel of the image analogously to the at least one pixel, however, by means of another quantizer. The method of this embodiment entails calculating a related differential value for the at least one other pixel out of a value of the other pixel and at least a related surrounding pixel value as well as selecting another quantizer out of the plurality of quantizers. The differential value belonging to the other pixel is assigned to a related quantizer value by means of another quantizer, which is assigned to a bit sequence by means of the coding. The selection of the other quantizer can (analogous with the above) can take place, thereby taking a variable into account.

In particular, in this way, different pixels of the image can be coded under the use of different quantizers, meaning there is an alternation between different quantizers, for example, in the form of a modulation. In particular, this makes a control of the coding for the pixels possible depending on a respective characteristic of the image and/or resources that are respectively available.

In accordance with a favorable embodiment, a method according to the invention comprises—a determination of an data volume for the at least one pixel, which is required for a transmission and/or a saving of the bit sequence, as well as comparing the data volume with a target data volume; dependent on the at least one pixel, the target data volume can thereby be or have been determined by image characteristics and/or technical conditions of an apparatus carrying this out. Based on the comparison, for example, a decision can be taken on if the bit sequence is transmitted or saved, or not.

In an embodiment where, as is described above, a bit sequence is additionally assigned to another pixel analogously to at least one pixel under the use of another quantizer, the other quantizer can be selected based on the mentioned comparison (or its result). In particular, in this way, a regulation of the coding can take place for subsequently processed pixels.

In addition or as an alternative, based on the mentioned comparison (meaning its result), another quantizer of the plurality can be selected, using which the process is then repeated accordingly so that the differential value is assigned to another quantizer value by means of the other quantizer and this is assigned to another bit sequence by means of the coding.

In this way, the data volume that is required for a transmission and/or saving the bit sequence can be controlled. In particular, the bit sequence can thereby be transmitted subject to the adherence of a given target data volume (bandwidth) and with a lower level of latency as well as be decoded in a receiver with a low level of computing effort.

In accordance with a favorable embodiment, a method according to the invention entails performing a classification for the at least one pixel based on a neighboring region of the pixel; the surrounding region can comprise the proximity of the pixel (in which the surrounding pixel value occurs). The selection of the quantizer and/or a determination of the above-mentioned target data volume (using which, as mentioned above, a data volume respectively required for a transmission and/or a saving of the bit sequence can be compared) can then take place based on the classification.

The classification makes an avoidance and/or decrease of saving or transmission errors and/or visible artefacts possible by being able to detect a respective situation that can lead to such interferences. The classification can preferably comprise a determination of at least one first difference from pixel values of pixels, which are adjacent in the proximity in a first direction, and/or at least one square of such a first difference. Furthermore, the classification can entail a determination of at least one second difference from pixel values of pixels, which are adjacent in the proximity in a second direction, which is different from the first one, and/or at least one square of such a second difference as well as a comparison of the at least one first difference or square with the at least one second difference or square.

In accordance with a preferred embodiment, a (first) method (in accordance with the respective embodiment) according to the invention is executed in a digital camera. The method can additionally entail capturing the image with a digital camera (preferably with the one executing the method).

The apparatus according to the invention is used for the coding of an image consisting of a plurality of pixels and is set up to carry out a first method according to the invention in accordance with an embodiments disclosed in this publication. In particular, the apparatus can comprise a digital camera.

A system according to the invention is used to transmit image data and comprises an apparatus according to the invention in accordance with one of the embodiments disclosed within this publication as well as the receiver unit. The comprised apparatus is thereby set up to transmit the respective bit sequence to the receiver for at least one pixel of an image coded in accordance with an embodiment of the first method according to the invention. The receiver is set up to receive the at least one bit sequence having thereby been transmitted, (in accordance with a decoding rule belonging to the coding), convert it into a respective received pixel value and integrate it into a received image. In particular, the system is set up to carry out a method according to the invention, which is referred to as a "second" method, which serves to transmit an image.

The system can additionally include a display (e.g., a screen) for displaying the received image.

BRIEF DESCRIPTION OF THE DRAWINGS

Preferred exemplary embodiments of the invention will be described in detail in the following based on the drawings. It is to be understood that individual elements and components can also be combined in a different manner than what is shown. Reference numbers for elements corresponding to each other are used across all figures and, if applicable, not newly described for each figure.

On a schematic level, the figures show.

DETAILED DESCRIPTION OF THE PREFERRED EMBODIMENTS

Figure 1:
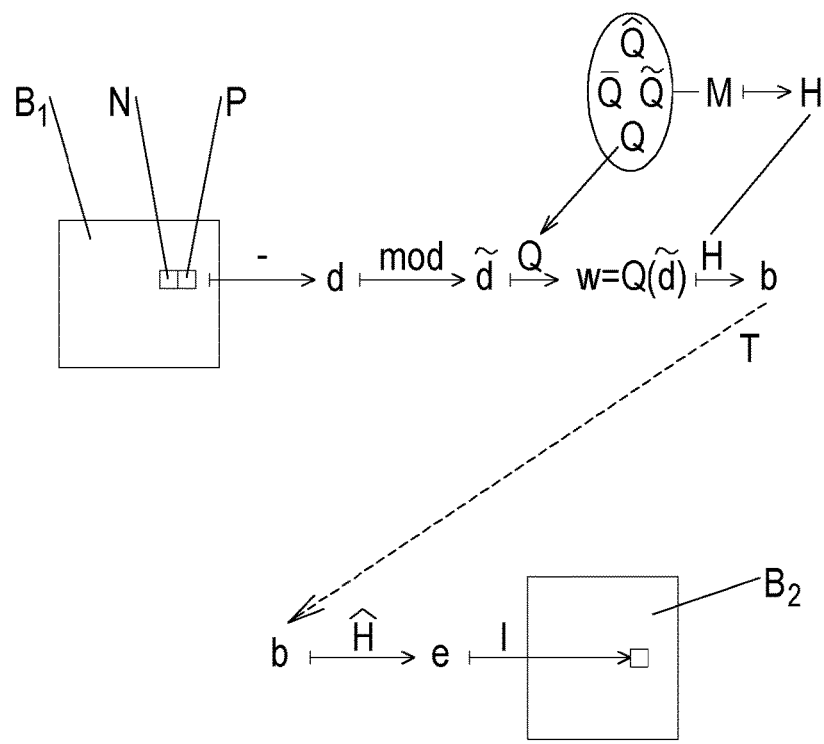
FIG. 1: an approach in accordance with an exemplary embodiment of a second method according to the invention.

In FIG. 1, an approach for transmitting an image $B_1$ comprising or consisting of a plurality of pixels in accordance with an embodiment of the second method according to the invention is schematically shown: By means of a differential operator "-", a differential value is calculated for at least one pixel p of the plurality in comparison to a surrounding pixel value, in the present, a pixel value of a neighboring pixel N; thereby, the working direction in the example shown is horizontal towards the left, meaning the neighboring pixel lies horizontally towards the left next to the at least one pixel p. It is to be understood that, as an alternative, another working direction is possible.

The calculation of the differential value is shown in the drawing by means of an assignment arrow; in this sense, its differential value d is assigned to the pixels p, N, e.g., d=p−N.

By means of a residual class consideration, so a Modulo calculation mod, the differential value is d is assigned to a non-negative modified differential value d as described above. This lies in the respective definition ranges of quantizers Q, $\tilde{Q}$, $\hat{Q}$, $\overline{Q}$ of a plurality M. The modulo operation is shown in FIG. 1 as an explicit step. As an alternative, it can also be implicitly executed by showing the differential value in a binary manner with a specified number bits.

From the plurality M, a quantizer Q is selected, which maps the modified differential value $\tilde{d}$ onto a quantizer value w=Q($\tilde{d}$).

By means of a coding H, which is based on an averaging of incidences of values, the individual quantizers Q, $\tilde{Q}$, $\hat{Q}$, $\overline{Q}$ of the plurality M can assume for pixel value differences respectively, the quantizer value w is assigned to a bit sequence b. The assignment thereby takes place independently of which of the quantizers has actually provided the quantizer value w in each specific case. In accordance with an alternative design variant, a sequence containing the quantizer value (which can, for example, additionally contain at least one other quantizer value, which can result from other pixel differences and/or at least one other quantizer value) is assigned to the bit sequence (not shown).

By means of a suitable interface T, the bit sequence b is transmitted from an apparatus V to a receiver E, in which the bit sequence is transformed into a received pixel value e by means of a decoding $\hat{H}$ matching the coding H. This is integrated using a totalizer and/or an integrator I into a received image B2. For the decoding, it is also not necessary to know which quantizer was involved when determining a bit sequence. Therefore, the decoding can be implemented in a low resource manner and, in addition, the exact functioning of the coding does not need to be passed on to the receiver. The low level of complexity of the coding and, thereby, the required arithmetic operations makes the use of the method possible in real-time applications, in particular.

A possible regulation of the coding is not shown in FIG. 1. Thereby, a data volume required for the transmission of the bit sequence b can be determined (which, for example, can entail determining a length of the bit sequence). The required data volume can be compared with the target data volume, which can be or has been determined depending on the at least one pixel, image characteristics, on technical conditions of an apparatus carrying this out and/or on a classification of a surrounding region of the pixel.

Depending on the comparison result, either the transmission can take place or another quantizer $\hat{Q}$, for example, the quantizer from the plurality M can be selected, by means of which the modified differential value $\tilde{d}$ can then be assigned to another quantizer value $\hat{w}$=$\hat{Q}$($\tilde{d}$). Thereby, $\hat{w}$≠w can apply. The other quantizer value iv can then be assigned to another bit sequence, the required data volume of which is, in turn, determined and can be compared with the target data volume. Thereby, a regulation of the coding and thus preferably a configuration of the compression rates to be achieved can take place.

In addition or as an alternative, in the case of consideration another pixel of the plurality (or a differential value belonging to the other pixel to the value of a pixel in the proximity of another pixel), a respective quantizer can be selected depending on the comparison result. Thereby, a regulation of the coding can also take place.

Figure 2:
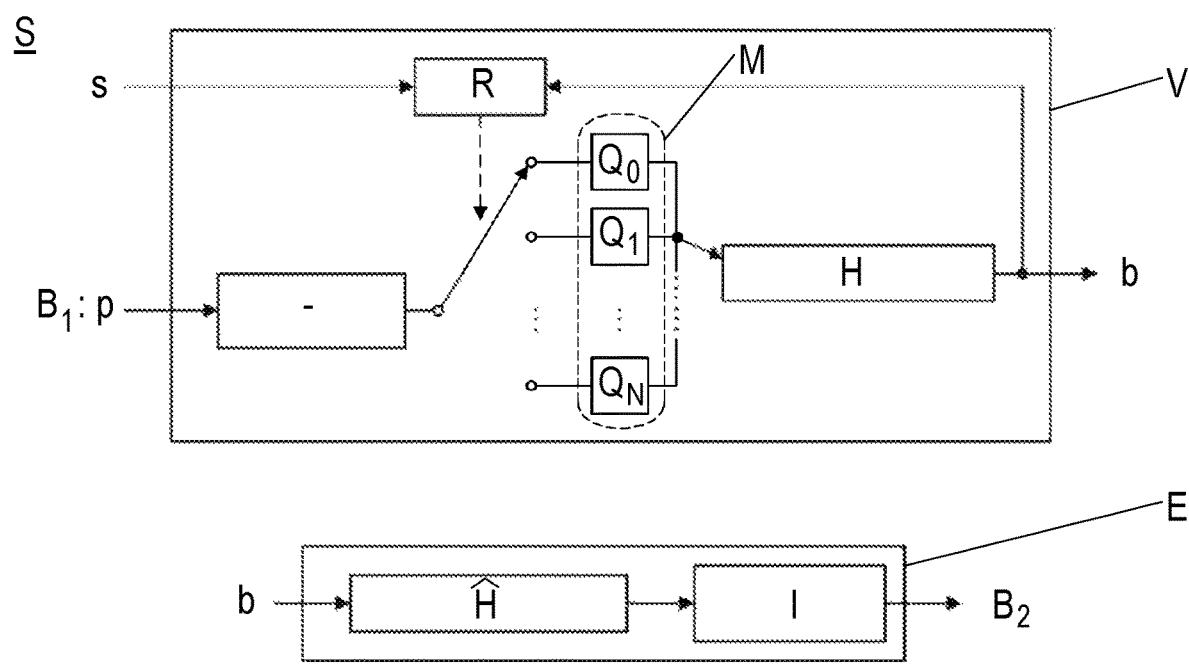
FIG. 2: a system according to the invention in accordance with an exemplary embodiment.

In FIG. 2, a corresponding structure of a system S according to the invention for transmitting image data is schematically shown. The system S comprises an apparatus V, which is set up to carry out a (first) method according to the invention, and a receiver E.

In turn, the apparatus V calculates a differential value for a pixel value p with reference to a surrounding pixel value by means of a differential operator "-". Furthermore, a selection of a quantizer from a plurality M takes place, which includes the quantizer Q0, Q1, . . . , QN (for a natural number N). Preferably, the quantizers must be arranged in such a way that the respective value sets are contained within one another.

In the situation shown, the quantizer Q1 is selected. By means of this quantizer, a quantizer value is assigned to the difference value, which is assigned to a bit sequence b by means of a coding H, which is universally defined for all quantizers of the plurality M.

In a control unit R of the apparatus V, a data volume required for a transmission of the bit sequence is determined and compared with a target data volume s, for example, as is described above. If the comparison results in that the data volume does not meet the requirements, another quantizer of the plurality M can be selected (to be applied to the differential value of the pixel under consideration and/or a subsequently processed pixel of the plurality).

Figure 3A:
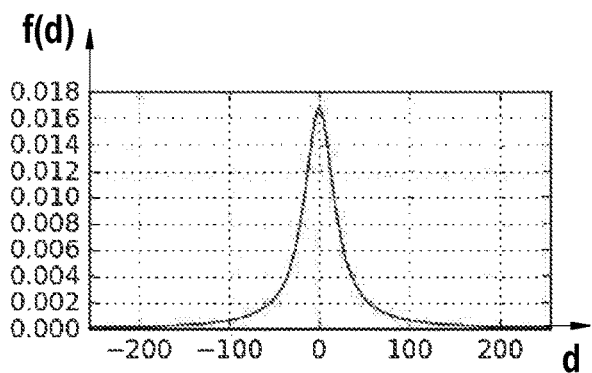
FIG. 3a, b: a probability density and a function resulting from this in the case of the modulo operation.
Figure 3B:
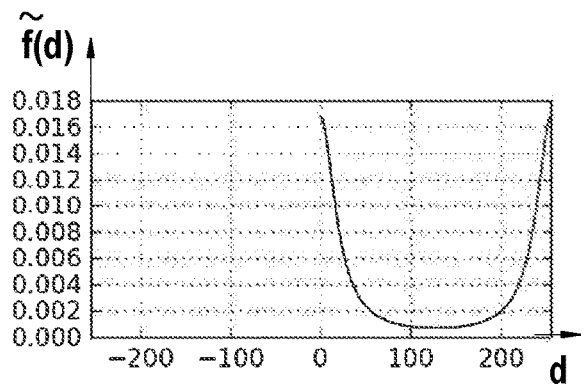

In FIGS. 3a, 3b, principles for a favorable construction of quantizer of the plurality, in particular of the selected quantizer, are illustrated. Thereby, in the example shown, possible pixel values p are taken as a basis, for which 0≤P≤255 applies.

Thereby, FIG. 3a is a probability density $f$ for the Cauchy distribution, and that having the scale parameter s=20. Using this scale parameter, the probability density (preferably being optimal, so that the smallest level of error is generated under all Cauchy distributions) approximates a function, which assigns the relative frequency of occurrence to the conceivable differences of two pixel values, at which the differences occur in a related digital image of a predetermined image set respectively.

As is mentioned above, another scale parameter can provide an optimal approximation in the mentioned sense for different digital images of an image set respectively and the probability densities belonging to the images can preferably be determined, for example, by means of forming a weighted or unweighted average value.

Using the graphs of the function $\tilde{f}$, FIG. 3b shows the effect of the modulo operator mod 256: {−255, . . . , 255}→{0, . . . , 255} with mod 256 (d):=d mod 256 on the incidences (of the modified differences).

Thereby, a quantizer with correspondingly reduced definition set {0, . . . , 255} can be generated and used, the points of which (in contrast to the original possible differences) can each be presented with only 8 bits.

Figure 4:
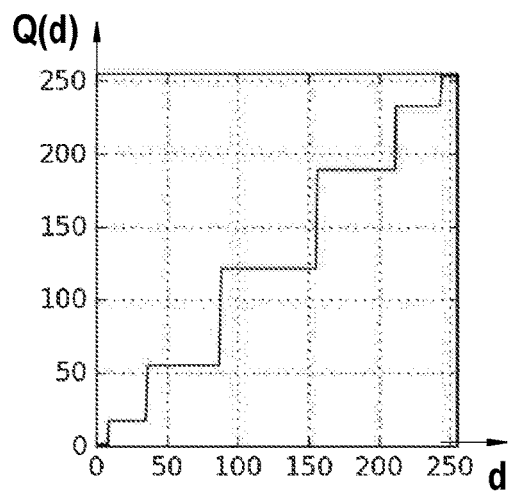
FIG. 4 a graph of an exemplary quantizer.

In FIG. 4, the graph of a quantizer is shown with a such definition range (continued upon the continuous interval) as an example. Thereby, the quantizer has 7 levels. In the outer regions of the interval, the points of which have higher likelihood of occurrence than the points in a center region (see FIG. 3b), the levels are respectively smaller so that, there, a precise differentiation of the points takes place due to the quantizer in the center region.

The quantizer can be or have been generated for the specified number of levels (here 7) from the aforementioned probability density by means of the Lloyd-Max method.

Figure 5:
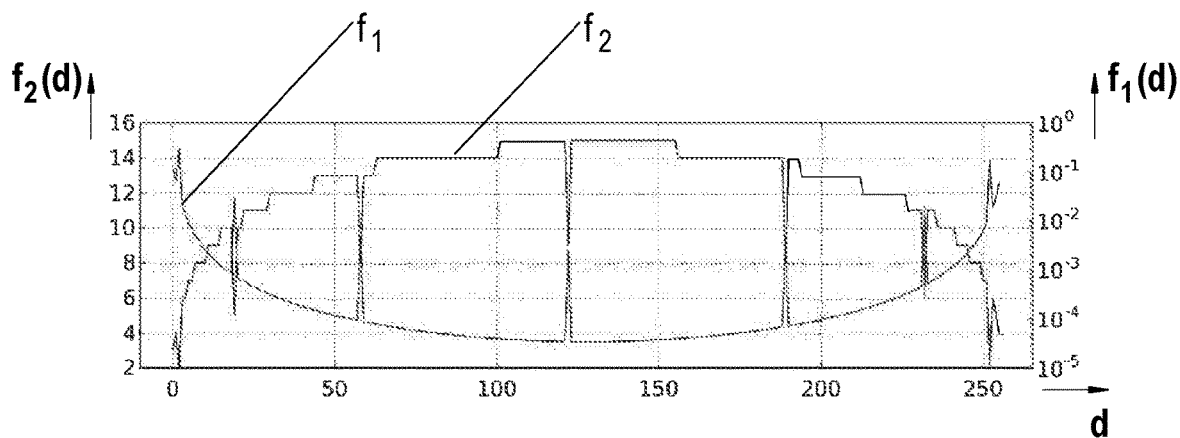
FIG. 5: two graphs which indicate the averaged incidences or the code length resulting from the coding for the two exemplary quantizers.

In turn, starting from the set {0, . . . , 255} as a possible pixel space, two function graphs are shown in FIG. 5. Both are based on a quantizer with seven levels and the ideal quantizer with 256 levels (being ideal for the present pixel space).

The function f1 (with the graphs arrange further below in the middle region) assigns an averaging of the relative incidences of the quantization levels belonging to the quantizers to the modified differences respectively.

The function f2 (with the graphs arranged in the middle region further above) assigns each of the modified differences a code length of the bit sequence, to which the modified differences are assigned in accordance with the very coding respective, which is based on the mentioned averaging.

The present invention relates to a method for coding an image B1 comprising or consisting of a plurality of pixels. Thereby, for at least one pixel of the plurality, a differential value d is calculated form a value p of the pixel and at least one surrounding pixel value N, which occurs in the proximity of the pixel in the image; furthermore, a quantizer Q, Q1. is selected from a plurality M of quantizers Q, $\tilde{Q}$, $\hat{Q}$, $\overline{Q}$, Q0, Q1, QN, the differential value (d) is assigned to a quantizer value w by means of the selected quantizer. The quantizer value is assigned to a bit sequence b by means of a coding H. Thereby, the coding is based on an averaging of incidences of values, the individual quantizers Q, $\tilde{Q}$, $\hat{Q}$, $\overline{Q}$, Q0, Q1, QN of the plurality can assume for pixel value differences respectively.

Furthermore, a method for transmitting an image consisting of a plurality of pixels to a receiver, an apparatus V for coding an image consisting of a plurality of pixels B1 and a system for transmitting image data.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST b bit sequence
d differential value
ď modified differential value
B$_1$ image
B$_2$ received image
d differential value
E receiver
f probability density function
I integrator
M plurality of quantizers
N surrounding pixel value
p value of a pixel
Q, $\tilde{Q}$, $\hat{Q}$, $\overline{Q}$, Q$_0$, Q$_1$, Q$_N$ quantizer
R control unit
s target data volume
S system
V apparatus
W quantizer value
H coding
$\hat{H}$ decoding

The invention claimed is:

1. A method for coding an image comprising a plurality of pixels, wherein, for at least one pixel of the plurality:

a differential value from a value of the at least one pixel and at least one surrounding pixel value is calculated, which occurs within a proximity of the at least one pixel in the image;

a quantizer is selected from a plurality of individual quantizers;

the differential value is assigned to a quantizer value by means of the selected quantizer; and at least one of the quantizer value or a sequence containing the quantizer value with at least one additional quantizer value, is assigned to a bit sequence by means of a coding, wherein the coding is based on an averaging, over the plurality of individual quantizers, of frequencies of values the individual quantizers of the plurality respectively assume when applied to pixel value differences.

2. The method according to claim 1, wherein the coding is additionally based on at least one digital reference image and wherein said frequencies each indicate a respective frequency of occurrence, with which a respective quantizer assumes a respective value when applied to pixel value differences in the at least one digital reference image.

3. The method according to claim 1, wherein the coding comprises an entropy coding.

4. The method according to claim 3, wherein the entropy coding comprises at least one of a Huffman-coding, another arithmetical coding, or an ANS coding.

5. The method according to claim 1, wherein, under each two quantizers of the plurality of individual quantizers, a first quantizer and a second quantizer are such that the first quantizer has a value set, which has fewer elements than the value set of the second quantizer, wherein the value set of the first quantizer is contained within the value set of the second quantizer.

6. The method in accordance with claim 1, which additionally entails a determination of at least one quantizer of the plurality with at least one of a specified number of levels taking another quantizer of the plurality of individual quantizers into account with a low number of levels, or a plurality of probability density functions, which approximate a relative frequency of occurrence of difference values occurring in a respectively related digital image of an image set.

7. The method according to claim 1, wherein, for the at least one pixel, a data volume required for at least one of a transmission or saving of the bit sequence is determined and is compared with a target data volume.

8. The method according to claim 7, which entails selecting another quantizer of the plurality of individual quantizers based on a comparison for the at least one pixel and wherein the differential value is assigned to another quantization value by means of another quantizer, which is assigned to another bit sequence by means of the coding.

9. The method according to claim 1, wherein another quantizer is additionally selected for at least one other pixel of the plurality; furthermore, a differential value belonging to the other pixel is calculated from a value of the other pixel and at least one surrounding pixel value, which occurs in the proximity of the other pixel in the image, wherein, furthermore, another quantizer of the plurality is selected, and wherein, by means of the other selected quantizer of the plurality of quantizers, a quantizer value is assigned to the differential value belonging to the other pixel, which quantizer value is assigned to a bit sequence by means of the coding.

10. The method according to claim 9, wherein, for the at least one pixel, a data volume required for at least one of a transmission or saving of the bit sequence is determined and is compared with a target data volume, wherein the other quantizer is selected based on the comparison.

11. The method according to claim 1, wherein a classification is carried out at least for the at least one pixel based on a surrounding region of the at least one pixel, based on which at least one of a respective target data volume is determined for the at least one pixel or the respective quantizer is selected.

12. The method according to claim 11, wherein the classification entails
   determining at least one first difference from pixel values of pixels that are adjacent in the proximity in a first direction, and/or at least one square of such a first difference,
   determining at least one second difference from pixel values of pixels, which are adjacent in the proximity in a second direction, which is at least one of different from the first one or at least one square of such a second difference, and
   comparing the at least one first difference or square with the at least one second difference or square.

13. The method according to claim 1, additionally comprising capturing the image using a digital camera.

14. A method for transmitting an existing image from a plurality of pixels to at least one of a receiver or a memory unit, wherein the method entails
   coding the image under the use of a method in accordance with claim 1,
   transmitting the at least one bit sequence obtained with the application to the receiver or the memory unit;
   reconverting the bit sequence into a received pixel value; and
   integrating the received pixel value into a received image.

15. An apparatus for coding an image comprising a plurality of pixels, wherein the apparatus is configured to carry out a method according to claim 1.

16. The apparatus in accordance with claim 15, comprising a digital camera for capturing the image.

17. A system for the transmission of image data, wherein the system comprises an apparatus according to claim 15 as well as a receiver, wherein the apparatus is configured to transmit the respective bit sequence to the receiver for at least one pixel of an image coded in accordance with one of the methods according to claim 1, and wherein the receiver is configured to receive the transmitted bit sequence, convert in to a respective received pixel value and integrate it into a received image.

* * * * *